US010628369B2

(12) United States Patent
Minato et al.

(10) Patent No.: US 10,628,369 B2
(45) Date of Patent: Apr. 21, 2020

(54) HEADER IMPROVEMENTS IN PACKETS ACCESSING CONTIGUOUS ADDRESSES

(71) Applicant: Toshiba Memory Corporation, Tokyo (JP)

(72) Inventors: Kensuke Minato, Kanagawa (JP); Takashi Yamaguchi, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/153,200

(22) Filed: Oct. 5, 2018

(65) Prior Publication Data

US 2019/0286604 A1 Sep. 19, 2019

(30) Foreign Application Priority Data

Mar. 19, 2018 (JP) ................... 2018-051231

(51) Int. Cl.
*G06F 13/40* (2006.01)
*G06F 13/42* (2006.01)
*G06F 3/06* (2006.01)

(52) U.S. Cl.
CPC ........ *G06F 13/4221* (2013.01); *G06F 3/0613* (2013.01); *G06F 3/0655* (2013.01); *G06F 3/0679* (2013.01); *G06F 13/4282* (2013.01); *G06F 2213/0026* (2013.01)

(58) Field of Classification Search
CPC .... G06F 3/0613; G06F 3/0655; G06F 3/0679; G06F 13/4221; G06F 13/4282; G06F 2213/0026
See application file for complete search history.

(56) References Cited

U.S. PATENT DOCUMENTS

| 7,916,750 | B2* | 3/2011 | Das Sharma | ....... G06F 13/4221 370/469 |
| 8,135,923 | B2* | 3/2012 | Haraden | ............. G06F 13/4282 365/239 |
| 8,799,550 | B2* | 8/2014 | Luk | ..................... G06F 13/4282 370/469 |
| 9,411,521 | B2* | 8/2016 | Lu | ......................... G06F 3/0611 |
| 9,612,989 | B2 | 4/2017 | Eguchi et al. | |
| 9,984,027 | B2* | 5/2018 | Stewart | ................. H04L 49/103 |
| 2007/0130397 | A1* | 6/2007 | Tsu | ..................... G06F 13/4022 710/62 |
| 2007/0147426 | A1* | 6/2007 | Sharma | ............... G06F 13/4221 370/469 |

(Continued)

FOREIGN PATENT DOCUMENTS

JP 3198547 B2 * 8/2001

OTHER PUBLICATIONS

'PCI Express Base Specification Revision 3.0' Nov. 10, 2010. (Year: 2010).*

(Continued)

*Primary Examiner* — Steven G Snyder
(74) *Attorney, Agent, or Firm* — Kim & Stewart LLP

(57) ABSTRACT

An information processing system includes a transmission device configured to sequentially transmit a first packet and a second packet containing data to be stored in contiguous logical addresses of a destination device, to the transmission destination device. The first packet includes a first header, and the second packet includes a second header smaller in size than the first header.

15 Claims, 10 Drawing Sheets

(56) References Cited

U.S. PATENT DOCUMENTS

| | | | |
|---|---|---|---|
| 2008/0267001 A1* | 10/2008 | Haraden | G06F 13/4282 |
| | | | 365/239 |
| 2014/0369365 A1* | 12/2014 | Denio | H04L 69/16 |
| | | | 370/474 |
| 2015/0347027 A1* | 12/2015 | Lu | G06F 3/0611 |
| | | | 711/103 |
| 2016/0147693 A1* | 5/2016 | Stewart | H04L 49/103 |
| | | | 710/313 |
| 2016/0335209 A1 | 11/2016 | Jau et al. | |
| 2017/0052916 A1 | 2/2017 | Kollu | |
| 2018/0181432 A1* | 6/2018 | Adler | G06F 9/467 |

OTHER PUBLICATIONS

'PCIe catches up in embedded system design' by Matt Jones, IDT—Feb. 7, 2009. (Year: 2009).*

* cited by examiner

| Fmt [2:0] | Corresponding TLP Format |
|---|---|
| 000b | 3 DW header, no data |
| 001b | 4 DW header, no data |
| 010b | 3 DW header, with data |
| 011b | 4 DW header, with data |
| 100b | TLP Prefix |
| 101b | Sequential Header |
| 110b~111b | Reserved |

FIG. 5

| TLP Type | Fmt [2:0] | Type [4:0] | Description |
|---|---|---|---|
| MRd | 000 001 | 0 0001 | Memory Read Request |
| Mwr | 010 011 | 0 0000 | Memory Write Request |
| IORd | 000 | 0 0010 | I/O Read Request |
| IOWr | 010 | 0 0010 | I/O Write Request |
| CfgRd0 | 000 | 0 0100 | Configuration Read Type 0 |
| CfgWd0 | 010 | 0 0100 | Configuration Write Type 0 |
| CfgRd1 | 000 | 0 0101 | Configuration Read Type 1 |
| CfgWd1 | 010 | 0 0101 | Configuration Write Type 1 |

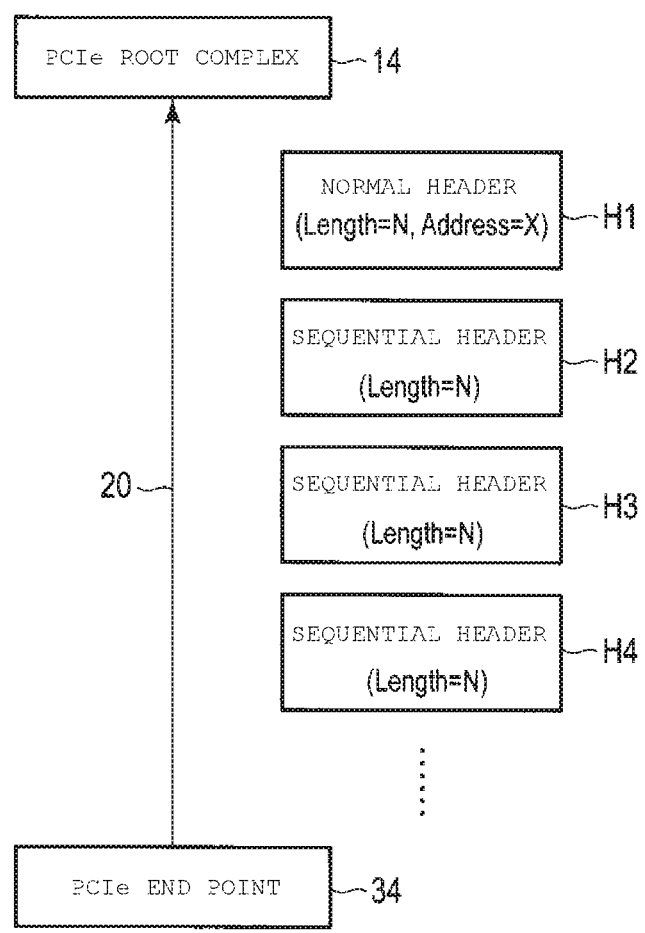

| HEADER | Address | Length |
|---|---|---|
| NORMAL | X | N |
| SEQUENTIAL | X+N | N |
| SEQUENTIAL | X+2N | N |
| SEQUENTIAL | X+3N | N |
| NORMAL | Xa | Na |

| HEADER | Address | Length |
|---|---|---|
| NORMAL | Y | M |
| SEQUENTIAL | Y+M | M |
| NORMAL | Ya | Ma |

FIG. 13A

| | | | | |
|---|---|---|---|---|
| FIRST TLP | Token (4B) | Header (16B) | Data (128B) | LCRC (4B) |
| SECOND TLP | Token (4B) | Header (16B) | Data (128B) | LCRC (4B) |
| ⋮ | | ⋮ | | |
| 8192-th TLP | Token (4B) | Header (16B) | Data (128B) | LCRC (4B) |

FIG. 13B

| | | | | |
|---|---|---|---|---|
| FIRST TLP | Token (4B) | Header (16B) | Data (128B) | LCRC (4B) |
| SECOND TLP | Token (4B) | Header (8B) | Data (128B) | LCRC (4B) |
| ⋮ | | ⋮ | | |
| 8192-th TLP | Token (4B) | Header (8B) | Data (128B) | LCRC (4B) |

HEADER IMPROVEMENTS IN PACKETS ACCESSING CONTIGUOUS ADDRESSES

CROSS-REFERENCE TO RELATED APPLICATION

This application is based upon and claims the benefit of priority from Japanese Patent Application No. 2018-051231, filed Mar. 19, 2018, the entire contents of which are incorporated herein by reference.

FIELD

Embodiments described herein relate generally to data transmission in an information processing system.

BACKGROUND

As a method of transmitting signals between a central processing unit (CPU) and an input/output (I/O) device, PCI Express® (hereinafter, also referred to as PCIe®) has been proposed. In PCIe standards, a hierarchical structure is adopted, and a header is added to each of packets in a transaction layer.

DESCRIPTION OF THE DRAWINGS

FIGS. 3A to 3B are diagrams illustrating examples of headers of the TLP illustrated in FIGS. 2A and 2B.

FIG. 4 is a diagram for explaining a format included in the headers illustrated in FIGS. 3A to 3B.

FIG. 5 is a diagram for explaining a Type included in the headers illustrated in FIGS. 3A to 3B.

FIG. 6 is a diagram illustrating an example of the header of a write TLP transmitted from a PCIe end point to a PCIe root port in the first embodiment.

FIGS. 9A and 9B are diagrams illustrating examples of a history table according to the second embodiment.

FIGS. 13A and 13B are diagrams illustrating an example in which transmission efficiency is improved according to data transmission of the fourth embodiment.

DETAILED DESCRIPTION

Figure 1:
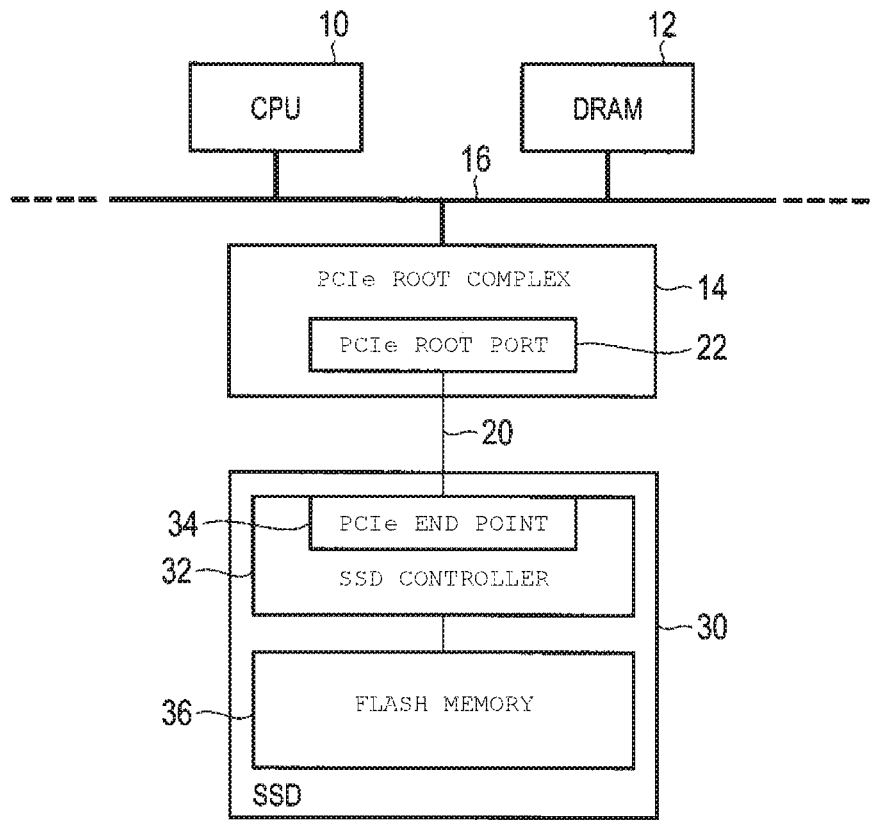
FIG. 1 is a block diagram illustrating an example of a configuration of an information processing system according to a first embodiment.

Embodiments provide an information processing system, an information processing method, and a memory system capable of improving efficiency of data transmission.

In general, according to one embodiment, an information processing system includes a transmission device configured to sequentially transmit a first packet and a second packet containing data to be stored in contiguous logical addresses of a destination device, to the destination device. The first packet includes a first header, and the second packet includes a second header smaller in size than the first header.

Hereinafter, the embodiments will be described with reference to drawings. This disclosure is merely an example. The disclosure is not limited by contents described in the following embodiments. The embodiments can be appropriately modified by those skilled in the art within the scope of the disclosure. In order to clearly describe the embodiments, the drawings may schematically represent sizes, shapes, and the like of each of units so that they may be different from actual ones. In the drawings, the same reference numerals are given to common elements, and detailed explanation thereof may be omitted.

First Embodiment

Configuration Example of System

FIG. 1 is a block diagram illustrating an example of a configuration of an information processing system according to the first embodiment. A CPU 10, a DRAM 12, a PCIe root complex (hereinafter, referred to as root complex) 14 are connected with a bus line 16. The root complex 14 is a device which controls data transmission between the CPU 10, and the DRAM 12 and an I/O device based on PCIe standards. The root complex 14 includes a PCIe root port (hereinafter, referred to as root port) 22. A solid state drive (SSD) 30 may be an I/O device that is connected to one root port 22. The SSD 30 includes a non-volatile semiconductor memory 36 as a storage unit and an SSD controller 32, and may be referred to as a memory system. The non-volatile semiconductor memory 36 is, for example, a NAND flash memory. Hereinafter, the non-volatile semiconductor memory 36 is referred to as a flash memory 36. The SSD controller 32 includes a PCIe end point (hereinafter, referred to as end point) 34. The SSD controller 32 is implemented using a circuit such as a system-on-a-chip (SoC). The SSD controller 32 is electrically connected to the flash memory 36 via a NAND interface such as a toggle DDR, an open NAND flash interface (ONFI). The SSD controller 32 is a memory controller configured to control the flash memory 36. The end point 34 is a device which controls data transmission between the end point 34 and the root complex 14 based on the PCIe standards. In the information processing system, the CPU 10 and the DRAM 12 are host devices and the DRAM 12 is also referred to as a host memory. In the information processing system, data is transmitted between the SSD 30 and the DRAM 12. The end point 34 is connected to the root complex 14 via a bus line 20. The root complex 14 may include a plurality of root ports 22. The number of end points connected to the root complex 14 is not limited to one and there may be a plurality of end points. A bandwidth of the bus line 16 is preferably wider than a bandwidth of the bus line 20.

The PCIe standards specify a hierarchical structure having a transaction layer, a data link layer, and a physical layer. Data flows from a software layer as an upper layer to a storage medium or transmission media as a lower layer via the transaction layer, the data link layer, and the physical layer in that order. Similarly, data flows from the storage medium or the transmission media to the software layer via the physical layer, the data link layer, and the transaction layer in that order. When passing data through the lower layer, each of the layers adds necessary information and when passing data through the upper layer, each of the layers extracts necessary information.

Packet

Figure 2A:
FIGS. 2A and 2B are diagrams illustrating an example of a transaction layer packet (TLP) transmitted in the information processing system according to the first embodiment.
Figure 2B:
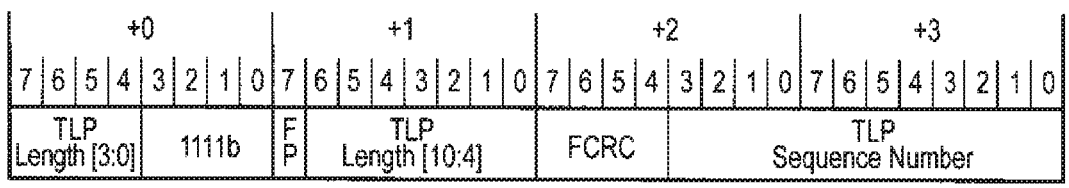

In the PCIe standards, several types of packets are defined, and one type of the packet is a transaction layer packet (TLP). FIGS. 2A and 2B illustrate an example of a configuration of the TLP. As illustrated in FIG. 2A, the TLP includes a token of 4 bytes, a header of 16 bytes, a data payload (hereinafter, referred to as data) of 128 bytes, and a link CRC (hereinafter, referred to as LCRC) of 4 bytes. A CRC of 4 bytes is calculated for a combination of the token, the header, and the data and the calculated CRC is appended to data as the LCRC so that a loss of at least a part of the packet of the data during transmission can be detected. A receiving device checks whether or not an error exists in the LCRC. When the error does not exist, an acknowledgement (referred to as Ack) is returned to the transmission device and when the error exists, a negative acknowledgement (referred to as Nak) is returned to the transmission device to request retransmission of the TLP.

FIG. 2B illustrates an example of the token. Bits 3 to 0 of a TLP Length are assigned to bits 7 to 4 of byte 0 of the token, 1111b is assigned to bits 3 to 0 of byte 0 of the token. A frame parity (referred to as FP) used for protecting the TLP Length is assigned to bit 7 of byte 1 of the token, bits 10 to 4 of the TLP Length are assigned to bits 6 to 0 of byte 1 of the token. A frame CRC (referred to as FCRC) used for protecting the TLP Length is assigned to bits 7 to 4 of byte 2 of the token, and a TLP sequence number is assigned to bits 3 to 0 of byte 2 and bits 7 to 0 of byte 3. End-to-end cyclic redundancy check (ECRC) of 4 bytes may be appended to the data (not illustrated in FIGS. 2A and 2B). In the case of adding the ECRC, the ECRC is appended at an end of the LCRC.

A transaction is a series of processes for reading and writing data. The transaction is transmission of the data between a requester and a completer and four address spaces are defined in the transaction. The TLP includes a memory request for requesting read/write from/to the address space mapped by the flash memory 36, an I/O request for requesting read/write from/to the address space mapped by the I/O device, a configuration request for requesting read/write from/to a configuration space. The TLP also includes a completion which is a response to a request packet, messages such as an interrupt, a power management request, and the like. Transmitting data to the address space to which the memory is mapped is called reading, and transmitting data from the address space to which the memory is mapped is called writing. In the same manner, transmitting data to the address space to which the I/O device is mapped is called reading, and transmitting data from the address space to which the I/O device is mapped is called writing.

TLP Header

Figures 3A, 3B:
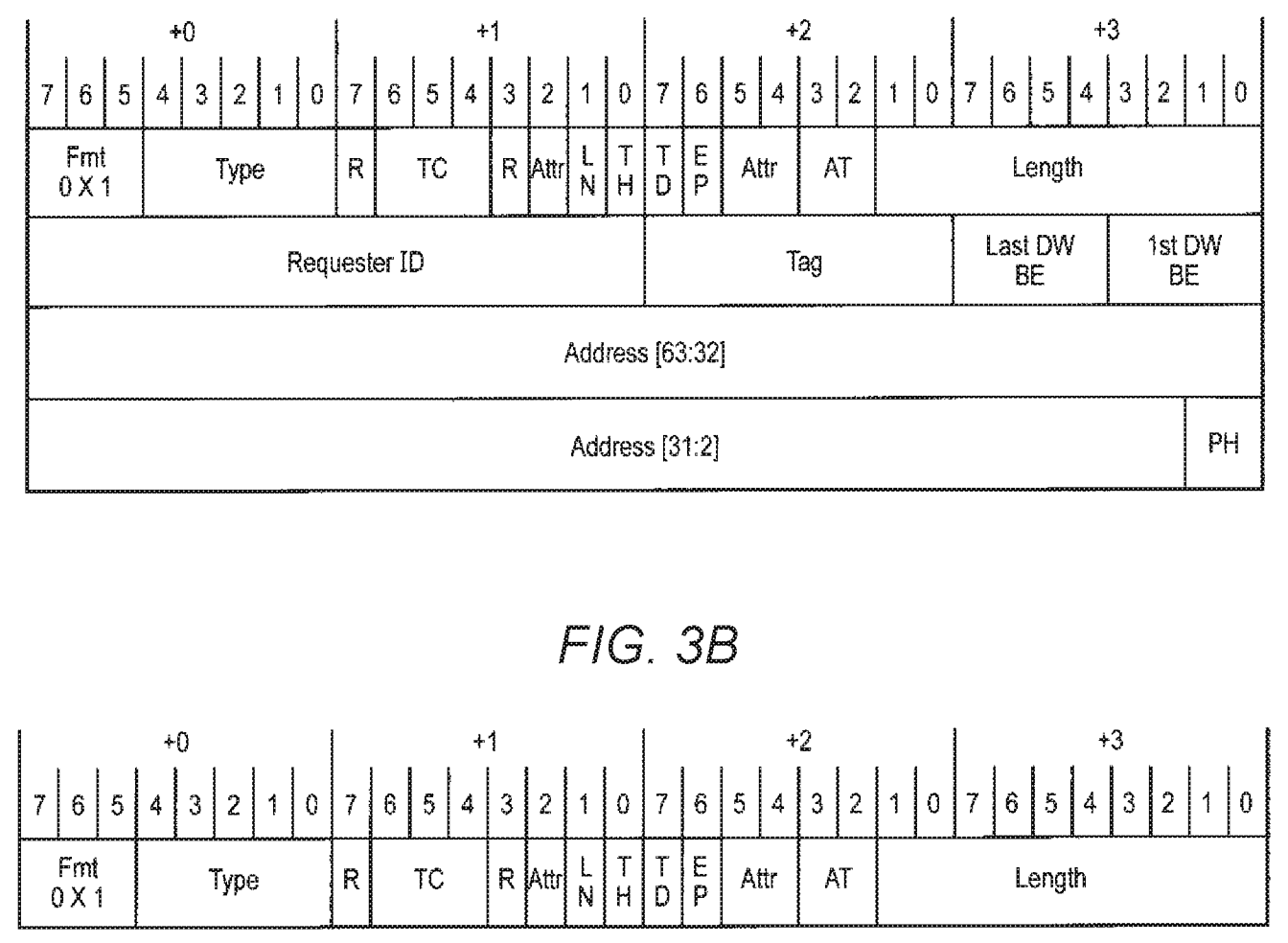

FIGS. 3A to 3B illustrate examples of the headers of the TLP as a memory request. FIG. 3A illustrates an example of a normal header. FIG. 3B illustrates an example of a sequential header used when data of the flash memory 36 is transmitted to continuous logical address spaces of the DRAM 12.

The normal header is 4 DWs (Double Word; 1 DW=4 bytes) as shown in FIG. 3A or 3 DWs. In a case where a length of an address is 32 bits, the normal header is 3 DWs and in a case where the length of the address is 64 bits, the normal header is 4 DWs. DW 0 is common to all of transactions.

In DW 0 of the normal header, a format (Fmt) is assigned to bits 7 to 5 of byte 0, a transaction type (Type) is assigned to bits 4 to 0 of byte 0; R is assigned to bit 7 of byte 1, a traffic class (TC) is assigned to bits 6 to 4 of byte 1, R is assigned to bit 3 of byte 1, bit 2 of an attribute (Attr) is assigned to bit 2 of byte 1, a lightweight notification (referred to as LN) is assigned to bit 1 of byte 1, and a TLP processing hints (referred to as TH) is assigned to bit 0 of byte 1; a TLP digest (TD) is assigned to bit 7 of byte 2, a parity (EP) is assigned to bit 6 of byte 2, bits 1 to 0 of the Attr are assigned to bits 5 to 4 of byte 2, an address type (AT) is assigned to bits 3 to 2 of byte 2, and a data length (Length) is assigned to bits 1 to 0 of byte 2 and bits 7 to 0 of byte 3. R means a reserved bit. DW 1 of the normal header includes a requester ID of 16 bits, a tag of 8 bits, a last DW byte enable (Last DW BE) of 4 bits, and a first DW byte enable (1st DW BE) of 4 bits. In a case where the address is 64 bits, the address is assigned to DW 2 and DW 3. In a case where the address is 32 bits, the address is assigned to DW 2. Since data is transmitted in a unit of 4 bytes in the PCIe, bit [1: 0] of the address is always zero. Accordingly, the bit [1: 0] of the address is not assigned. A processing hint (PH) assigned to remaining 2 bits of DW 3 to which the address is not assigned.

The format indicates a type of the header. The transaction type indicates a type of the request. The traffic class indicates a priority of the packet. The TLP digest indicates the presence or absence of the ECRC. The parity is used for detecting whether or not the packet is normally received. The data length indicates a data length of the packet and is described in units of DW. The requester ID is an ID uniquely indicating the transmission device (also referred to as requester) issuing the transaction based on the PCIe. The tag indicates a tag number for read management. The last DW byte enable indicates whether or not the last data in units of 32 bits is byte-enabled. The first DW byte enable indicates whether or not the first data in units of 32 bits is byte-enabled.

The sequential header, shown in FIG. 3B, consists of one DW of a head of the normal header and omits the second to fourth DWs of the normal header. That is, the sequential header does not include the requester ID or the address.

Format (Fmt)

FIG. 4 illustrates an example of the format (Fmt) in the TLP header. For example, the Fmt of 000b indicates that the header has a length of 3 DWs and is the normal header of the TLP that includes no data such as a read request. The Fmt of 001b indicates that the header has a length of 4 DWs, and is the normal header of the TLP that includes no data such as the read request. The Fmt of 010b indicates that the header has a length of 3 DWs, and is the normal header of the TLP that includes data such as a write request. The Fmt of 011b indicates that the header has a length of 4 DWs, and is the normal header of the TLP that includes data such as the write request. The Fmt of 100b indicates that the header is the normal header of the TLP including a TLP prefix. The Fmt of 101b indicates that the header is the sequential header.

110b to 111b of the Fmt are reserved. The Fmt indicating that the header is the sequential header is not limited to 101b, and may be any one of 110b to 111b. The TLP prefix is optionally added before the header.

The device, for example, the root complex 14 or the end point 34 which receives the TLP header can identify a type of the header based on the format. In a case where it is determined that the header is the sequential header, the root complex 14 or the end point 34 can calculate the address omitted in the sequential header by the data length and the address of the header received immediately before.

Type of TLP

The device which receives the TLP header can identify the type of the TLP by combining the format (Fmt) and the transaction type (Type) of the TLP header. FIG. 5 illustrates an example of a relationship between the TLP type, the format, and the transaction type. For example, in a case where the Fmt is 000b or 001b and the Type is 00001b, the TLP type is a memory read request MRd. In a case where the Fmt is 010b or 011b and the Type is 00000b, the TLP type is a memory write request MWr. In a case where the Fmt is 000b and the Type is 00010b, the TLP type is an I/O read request IORd. In a case where the Fmt is 010b and the Type is 00010b, the TLP type is an I/O write request IOWr. In a case where the Fmt is 000b and the Type is 00100b, the TLP type is a configuration read request (type 0) CfgRd0. In a case where the Emt is 010b and the Type is 00100b, the TLP type is a configuration write request (type 0) CfgWr0. In a case where the Fmt is 000b and the Type is 00101b, the TLP type is a configuration read request (type 1) CfgRd1. In a case where the Fmt is 010b and the Type is 00101b, the TLP type is a configuration write request (type 1) CfgWr1.

Transmission of TLP

The SSD 30 can cause the CPU 10 to transmit data stored in the DRAM 12 to the flash memory 36 (also referred to as SSD write) and to transmit the data stored in the flash memory 36 to the DRAM 12 (also referred to as SSD read). In a case of requesting the SSD write, the end point 34 transmits a read TLP to the root complex 14 and in a case of requesting the SSD read, the end point 34 transmits a write TLP to the root complex 14.

The read TLP transmitted in requesting the SSD write includes the address, but does not include the data. The address is a head address (referred to as read address) of an area of a logical address space in the DRAM 12 that stores the data requested by the end point 34. As the header of the read TLP, the normal header illustrated in FIG. 3A is used. Since a packet size of the read TLP is relatively small, even if a small size sequential header is used, a reduction ratio of the total amount of transmission of the packet is small and a merit of using the sequential header is small. When receiving the read TLP, the root complex 14 reads data from the DRAM 12 based on the logical address designated by the TLP and transmits a completion TLP that includes the read data to the end point 34. An SSD write request is completed by transmitting the read TLP and receiving the completion TLP.

The write TLP transmitted during the SSD read includes the address and the data. The address is a head address (referred to as write address) of the area of the logical address space in the DRAM 12 to which the data is to be stored. If the data to be transmitted cannot be accommodated in one packet, a plurality of write TLPs according to a size of the data are consecutively transmitted. As a header of a head of the packet, the normal header illustrated in FIG. 3A is used, but as a header of the packet other than the head, the sequential header illustrated in FIG. 3B may be used. Since a packet size of the write TLP is larger than the packet size of the read TLP, if a small size sequential header is used, a reduction ratio of the total amount of transmission of the packet is large and a merit of using the sequential header is large. When receiving the write TLP, the root complex 14 writes the transmitted data to the DRAM 12 based on the logical address designated by the TLP.

FIG. 6 illustrates only headers of the plurality of write TLPs continuously transmitted to the root complex 14 during the SSD read. Since the transmission device which continuously transmits the plurality of write TLPs is the same end point 34, the second and following write TLPs do not need the requester ID. For this reason, the end point 34 uses a normal header H1 as a header of the first TLP and uses sequential headers H2, H3, H4, . . . as headers of the second and following TLPs. The normal header includes the data length and the address. The sequential header includes the data length, but does not include the address.

When receiving the first write TLP, the root complex 14 writes the data included in the first write TLP to areas of the logical addresses X to X+N−1 of the DRAM 12 based on the normal header H1. When receiving the second write TLP, the root complex 14 can calculate an address (=X+N) not included in the sequential header H2 of the second write TLP based on a data length N and an address X included in the normal header H1 of the first write TLP. That is, the root complex 14 can restore the normal header from the sequential header H2. When receiving the second write TLP, the root complex 14 writes data included in the second write TLP to the logical addresses X+N to X+2N−1 of the DRAM 12 based on the data length N included in the sequential header H2, and the address X and the data length N included in the normal header H1 of the first write TLP.

Hereinafter, in the same manner, when receiving the i-th write TLP (i is an integer equal to or larger than 3), the root complex 14 restores the sequential header to the normal header and writes data to areas of the logical addresses X+(i−1)N to X+i*N−1 of the DRAM. Accordingly, the data from the SSD 30 is transmitted to the areas of the logical address space in which logical addresses are simply incremented in the DRAM 12.

Comparison of Transmission Efficiency of Memory Write Request

Figure 7A:
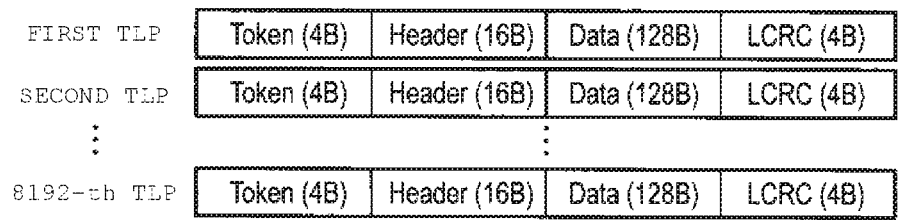
FIGS. 7A and 7B are diagrams illustrating an example in which transmission efficiency is improved according to data transmission of the first embodiment.
Figure 7B:
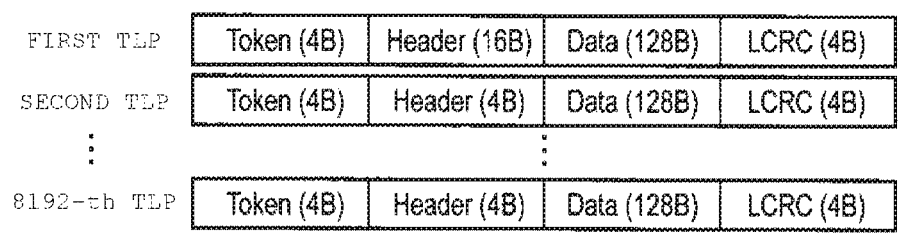

FIGS. 7A and 7B illustrate an example of transmitting the write TLPs when data of 1 MB is transmitted from the SSD 30 to the DRAM 12 (i.e., SSD read). FIG. 7A illustrates a transmission example of a comparative example and FIG. 7B illustrates a transmission example of the embodiment. In the comparative example, all of the write TLPs include the normal header of 16 bytes. In the embodiment, the only first write TLP includes the normal header and the second and following write TLPs include the sequential header. The data length is set to 128 bytes and the data is transmitted with 8192 write TLPs. In the comparative example, one write TLP is 152 bytes and the total amount of transmission of the 8192 write TLPs is 1,245,184 (=152×8192) bytes. In the embodiment, the first write TLP is 152 bytes, each TLP of the second and following write TLPs is 140 bytes, and the total amount of transmission of the 8192 write TLPs is 1,146,892 (=152+140×8191) bytes. In the embodiment, transmission efficiency is improved by approximately 8% (=1,146,892/1,245,184) as compared with the comparative example.

In a case where the TLP includes the ECRC, since the ECRC is not to be changed during the transmission, the ECRC cannot be used to verify the sequential header in which some DWs are omitted. In a case where the receiving device (i.e., PCIe root complex 14) receives the sequential header, the receiving device restores the normal header from the sequential header and verifies the ECRC.

According to the first embodiment, in order to continuously transmit data from the SSD 30 to the DRAM 12, the end point 34 continuously transmits a plurality of write TLPs to the root complex 14. By using the normal header for the first write TLP and using the sequential header, in which a part of the normal header is omitted, for the following write TLPs, an overhead of the header is reduced, and it is possible to improve transmission efficiency in continuously transmitting data. Since the logical address of the area of the DRAM 12 which stores the data continuously transmitted is an address being simply incremented, the root complex 14 can calculate an address (which is the information omitted in the second header) and restore the normal header from the sequential header. Accordingly, without transmitting the plurality of write TLPs that include all of the normal headers from the end point 34 to the root complex 14, the root complex 14 can store the data transmitted with the plurality of write TLPs in the areas in the DRAM 12 corresponding to the logical addresses being continuously incremented.

Second Embodiment

Configuration Example of System

Figure 8:
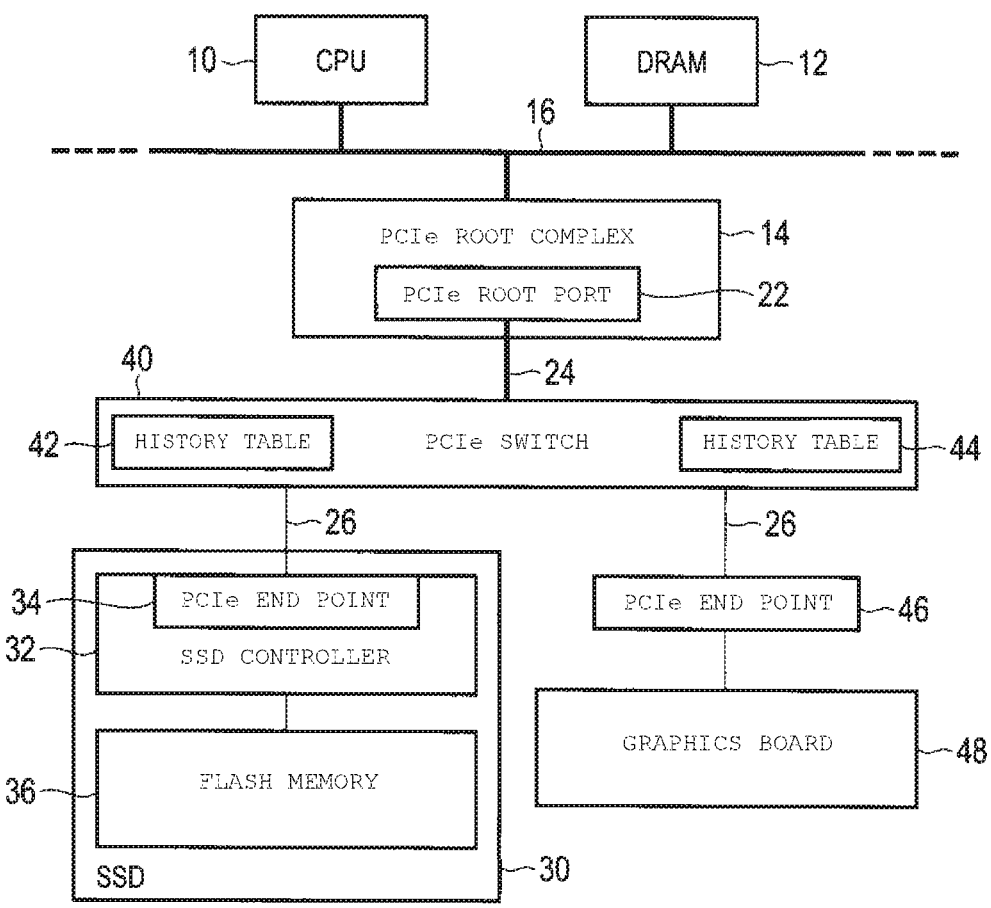
FIG. 8 is a block diagram illustrating an example of a configuration of an information processing system according to a second embodiment.

FIG. 8 is a block diagram illustrating an example of a configuration of an information processing system according to a second embodiment. In the first embodiment, one end point 34 is connected to one root port 22 (one-to-one connection between root port and end point), but in the second embodiment, a plurality of end points are connected to one root port 22. For this reason, a PCIe switch (hereinafter, simply referred to as switch) 40 is connected to the root port 22 via a bus line 24. The switch 40 includes a plurality (here, two) of downstream ports (not illustrated). The first end point 34 and a second end point 46 are respectively connected to the two downstream ports of the switch 40 via bus lines 26. The first end point 34 is the same as the end point 34 of the first embodiment and is included in the SSD 30. The second end point 46 is connected to a graphics board 48. The switch 40 transmits the memory read request transmitted from the root complex 14 to one of the first and second end points 34 and 46 according to an address included in the header. The switch 40 transmits the write TLP transmitted from the first and second end points 34 and 46 to the root complex 14. A bandwidth of the bus line 24 upstream of the switch 40 may be the same as a bandwidth of the bus line 16 between the root complex 14, the CPU 10, and the DRAM 12 and is preferably wider than a bandwidth of the bus line 26 downstream of the switch 40.

Transmission of Memory Write Request

Since the sequential header does not include the requester ID for identifying the transmission device, in a case where the write TLPs are transmitted from a plurality of transmission devices and are transmitted to the root complex 14 in a mixed state, the root complex 14 cannot determine continuity of the requests of the plurality of write TLPs. That is, if the root complex 14 can determine whether or not the plurality of write TLPs have the continuity, the root complex 14 restores the address omitted in the sequential header in the same manner as the first embodiment. However, if another transmission device transmits a write TLP while a certain transmission device transmits the plurality of write TLPs, the root complex 14 cannot determine whether or not the plurality of write TLPs have the continuity and cannot restore the address omitted in the sequential header. For this reason, the switch 40 instead of the root complex 14 monitors the continuity of the write TLPs from the plurality of end points 34 and 46. In a case where the transmission device of a transmitted write TLP is switched to another transmission device and the write TLP received immediately after the transmission device is switched includes the sequential header, the switch 40 converts the sequential header to the normal header. In the first embodiment, the root complex 14 converts the sequential header into the normal header, but in the second embodiment, the switch 40 provided between the end points (34 and 46), and the root complex 14 converts the sequential header into the normal header.

In order to convert the sequential header, the switch 40 includes a first history table 42 (see FIG. 9A) and a second history table 44 (see FIG. 9B). The first history table 42 stores the address and the data length included in the header of a write TLP from the first end point 34. The second history table 44 stores the address and the data length included in the header of a write TLP from the second end point 46. When receiving the write TLP including the normal header, the switch 40 writes the address and the data length in the header to the first history table 42 or the second history table 44. When receiving the memory write request that includes the sequential header, the switch 40 writes the data length in the sequential header to the first history table 42 or the second history table 44, calculates an address related to this memory write request by adding the address and the data length related to the TLP immediately before this memory write request, and writes the calculated address to the first history table 42 or the second history table 44.

Figure 10:
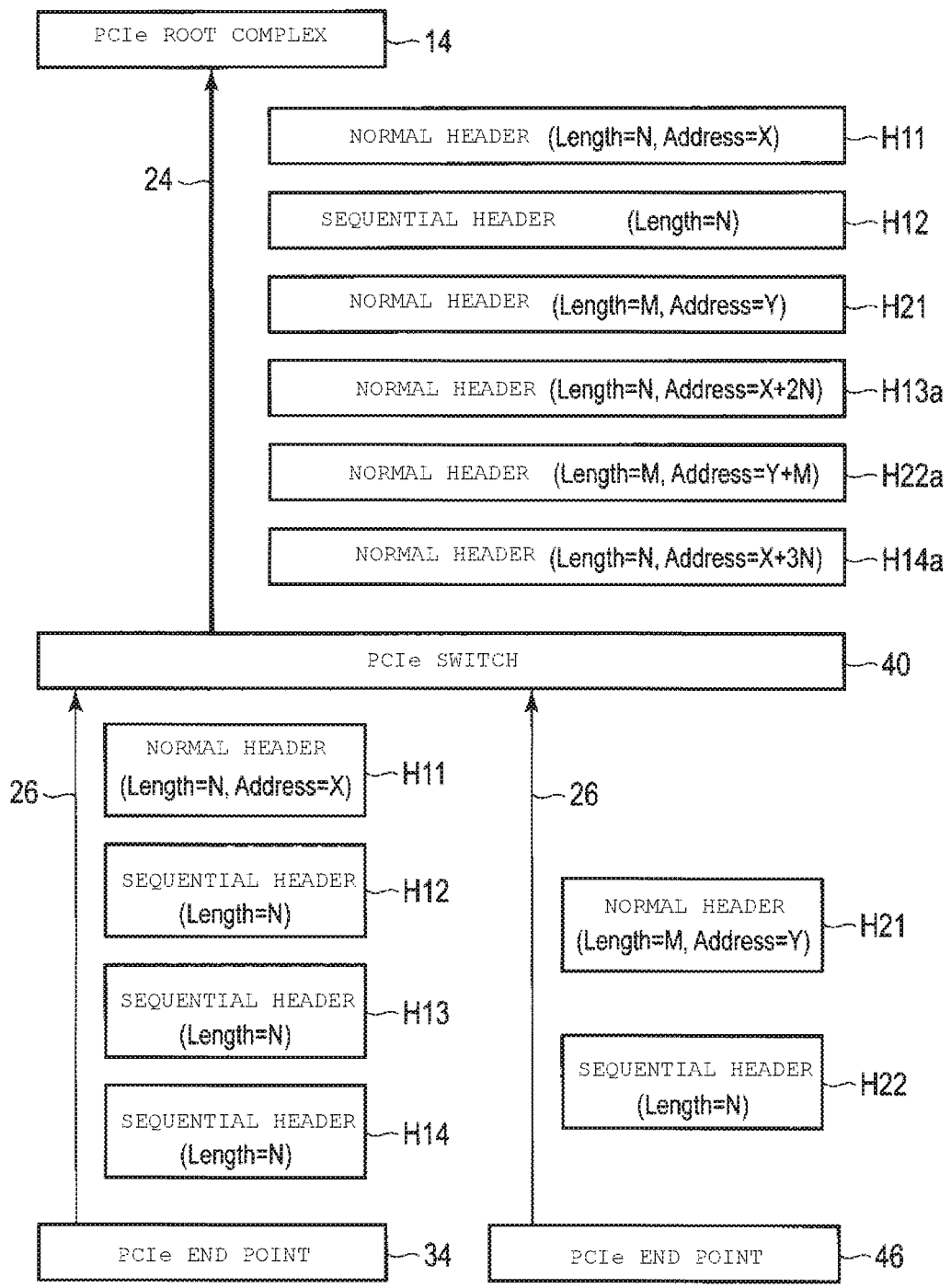
FIG. 10 is a diagram illustrating an example of a header of write TLPs transmitted from a PCIe end point to a PCIe root port in the second embodiment.

An example of transmitting write TLPs according to the second embodiment will be described with reference to FIG. 10. In FIG. 10, the only headers are illustrated and the token, the data, and the LCRC are not illustrated. A case where data transmitted from the SSD 30 is stored in the areas of the logical address space in which logical addresses are simply incremented from the logical address X of the DRAM 12, and data transmitted from the graphics board 48 is stored in the areas of the logical address space in which logical addresses are simply incremented from a logical address Y of the DRAM 12 will be described.

Each of the first end point 34 and the second end point 46 transmits a plurality of write TLPs to the switch 40. The first end point 34 in the SSD 30 continuously transmits the plurality of write TLPs to the switch 40. The first end point 34 transmits the first write TLP to the switch 40 by using a normal header H11 as the header. The normal header H11 includes the data length N and the address X. The first end point 34 transmits the plurality of write TLPs to the switch 40 by using sequential headers H12, H13, H14, . . . as the headers of the second and following write TLPs. The sequential headers H12, H13, H14, . . . include the data length N and do not include addresses. Although the data lengths of the write TLPs are the same with one other in the illustrated embodiment, the data lengths may be different for each of the TLPs in other embodiments.

The second end point 46 in the graphics board 48 also continuously transmits a plurality of write TLPs to the switch 40. The second end point 46 transmits the first write TLP to the switch 40 by using a normal header H21 as the header. The normal header H21 includes a data length M and the address Y. The second end point 46 transmits the plurality of write TLPs to the switch 40 by using sequential headers H22, . . . as the headers of the second and following write TLPs. The sequential headers H22, . . . include the data length M and do not include addresses. Although the data lengths of the write TLPs are the same with one other in the illustrated embodiment, the data lengths may be different for each of the TLPs in other embodiments.

The switch 40 receives the write TLPs in order as transmitted from the first end point 34 and the second end point 46. For example, the switch 40 receives (1) the write TLP including the normal header H11 transmitted from the first end point 34, (2) the write TLP including the sequential header H12 transmitted from the first end point 34, (3) the write TLP including the normal header H21 transmitted from the second end point 46, (4) the write TLP including the sequential header H13 transmitted from the first end point 34, (5) the write TLP including the sequential header H22 transmitted from the second end point 46, and (6) the write TLP including the sequential header H14 transmitted from the first end point 34 in this order.

The switch 40 transmits the write TLPs to the root complex 14 in order as received from the end points 34 and 46. For this reason, in write TLPs which the root complex 14 receives, the write TLPs transmitted from the second end point 46 may be mixed in the write TLPs transmitted from the first end point 34. As a result, the root complex 14 cannot determine continuity of the plurality of write TLPs and in some cases, the root complex 14 cannot restore the address omitted in the sequential header.

In order to solve this case, the switch 40 detects whether or not the transmission device (i.e., end point) of the memory write request is switched. When receiving the write TLP having the sequential header after detecting that the transmission device is switched, the switch 40 converts the sequential header into the normal header with reference to the history tables 42 and 44 and transmits the write TLP to the root complex 14. For example, as illustrated in FIG. 10, the sequential headers H13, H22, and H14 are converted into normal headers H13a, H22a, and H14a. As a result, the root complex 14 receives (1) the write TLP including the normal header H11 transmitted from the first end point 34, (2) the write TLP including the sequential header H12 transmitted from the first end point 34, (3) the write TLP including the normal header H21 transmitted from the second end point 46, (4) the write TLP including the normal header H13a transmitted from the first end point 34, (5) the write TLP including the normal header H22a transmitted from the second end point 46, and (6) the write TLP including the normal header H14a transmitted from the first end point 34 in order. Accordingly, the root complex 14 can correctly recognize the continuity of the received write TLP, can write the data transmitted from the SSD 30 to the areas of the logical address space in which logical addresses are simply incremented from the logical address X of the DRAM 12, and can write the data transmitted from the graphics board 48 to the areas of the logical address space in which logical addresses are simply incremented from a logical address Y of the DRAM 12.

Since the sequential headers of some of the write TLPs are replaced with the normal headers in the second embodiment, there is a possibility that transmission efficiency of the write TLP from the switch 40 to the root complex 14 becomes poor. However, transmission efficiency from the end points 34 and 46 to the switch 40 is improved. In a case where the bandwidth of the bus line 24 upstream of the switch 40 is wider than the bandwidth of the bus line 26 downstream of the switch 40, if the transmission efficiency from the end points 34 and 46 to the switch 40 is improved, transmission efficiency of the entire system can be improved.

Third Embodiment

Also in a third embodiment, a plurality of transmission devices are connected to one receiving device in the same manner as the second embodiment. The switch 40 of the second embodiment monitors continuity of a write TLP transmitted from the plurality of transmission devices and maintains the continuity of the write TLPs by converting the sequential header into the normal header if the transmission device is switched. A switch 40a of the third embodiment maintains the continuity of the write TLP by controlling an order of the write TLPs transmitted from the plurality of transmission devices to the root complex 14. In the third embodiment, the bandwidth of the bus line 24 upstream of the switch 40a may be the same as the bandwidth of the bus line 26 downstream of the switch 40a. Since a block diagram of the information processing system of the third embodiment is the same as the block diagram of the second embodiment illustrated in FIG. 8 except for the above, the block diagram of the information processing system of the third embodiment will be omitted.

Figure 11:
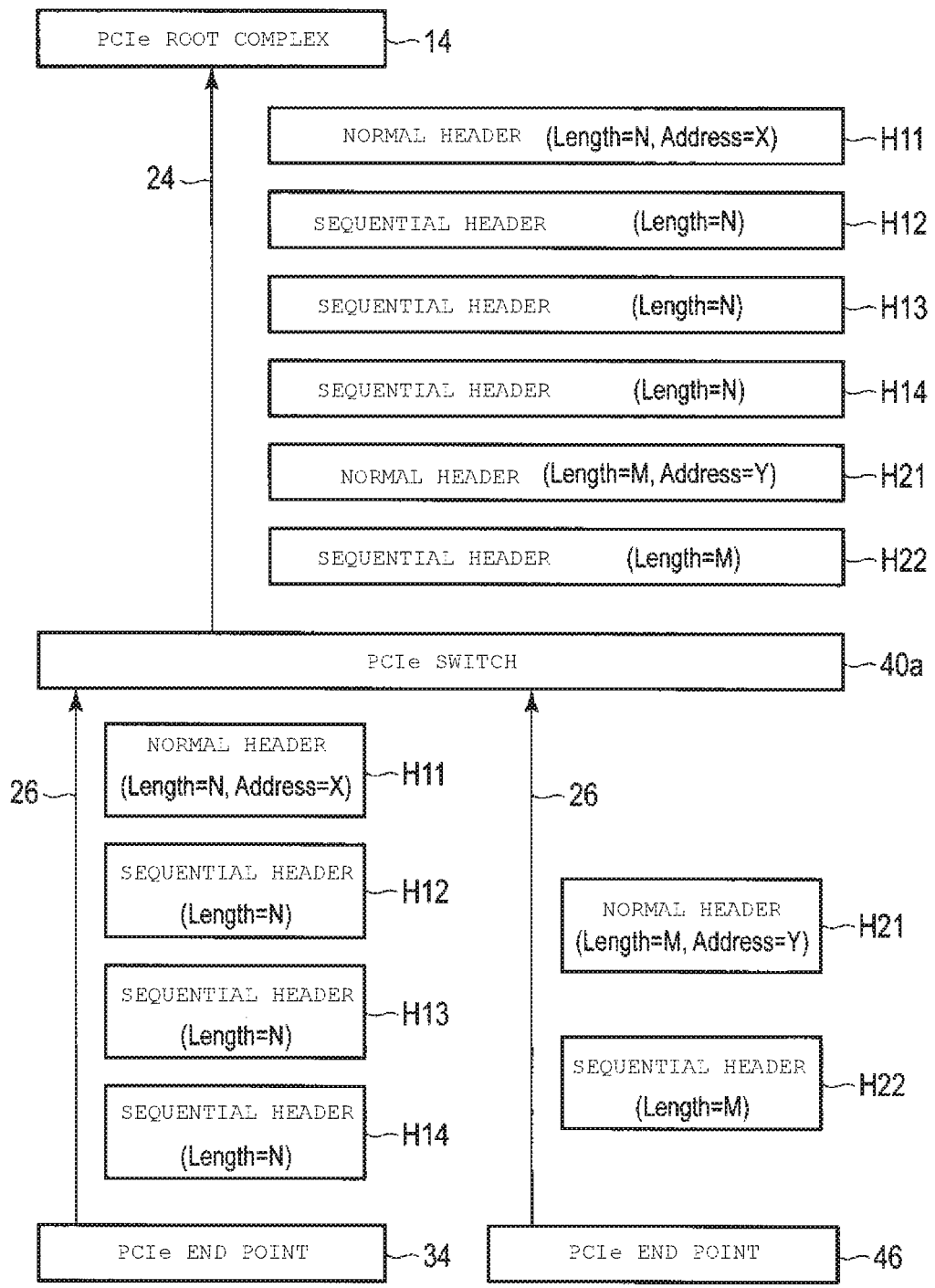
FIG. 11 is a diagram illustrating an example of a header of a write TLP transmitted from a PCIe end point to a PCIe root port in a third embodiment.

An example of transmitting a write TLP according to the third embodiment will be described with reference to FIG. 11. In the same manner as the second embodiment, the first end point 34 continuously transmits a plurality of write TLPs to the switch 40a. The first end point 34 transmits the first write TLP to the switch 40a by using a normal header H11 as the header. The normal header H11 includes the data length N and the address X. The first end point 34 transmits the plurality of write TLPs to the switch 40a by using the sequential headers H12, H13, . . . as the headers of the second and following write TLPs. The sequential headers H12, H13, . . . include the data length N and do not include addresses.

The second end point 46 also continuously transmits a plurality of write TLPs to the switch 40a. The second end point 46 transmits the first write TLP to the switch 40a by using the normal header H21 as the header. The normal header H21 includes the data length M and the address Y. The second end point 46 transmits the plurality of write TLPs to the switch 40a by using the sequential headers H22, . . . as the headers of the second and following write TLPs. The sequential headers H22, . . . include the data length M and do not include addresses.

When one of the first and second end points 34 and 46 starts to transmit the write TLP to the root complex 14, the switch 40a stores the write TLP from the other of the first and second end points 34 and 46 in a buffer memory (not illustrated) of the switch 40a. The switch 40a continuously stores the write TLP from the other of the first and second end points 34 and 46 in the buffer memory until all of the write TLPs from the one of the first and second end points 34 and 46 are transmitted to the root complex 14.

Accordingly, for example, the switch 40a stores all of the write TLPs from the second end point 46 in the buffer memory while all of the write TLPs are transmitted from the first end point 34 to the root complex 14 in order as received. When transmission of all of the write TLPs of the first end point 34 from the switch 40a to the root complex 14 is completed, the switch 40a transmits all of the write TLP from the second end point 46, stored in the buffer memory, to the root complex 14 in order as received. That is, the switch 40a transmits all of the write TLPs from the first end point 34 (or the second end point 46) to the root complex 14 continuously in order as received from the first end point 34 (or the second end point 46) regardless of a timing and an order of receiving the write TLPs. Since the root complex 14 continuously receives the write TLPs from the first end point 34 or continuously receives the write TLPs from the second end point 46, it is possible to convert the sequential header into the normal header.

For this reason, in the third embodiment, it is not necessary to convert the sequential header into the normal header of the write TLP transmitted from the switch 40a to the root complex 14 and it is possible to improve the transmission efficiency as compared with the second embodiment. Further, according to the third embodiment, since it is not necessary to monitor continuity of a transmission/reception relationship of the write TLPs transmitted from the plurality of end points by using the history table as in the second embodiment, the configuration becomes simple.

Fourth Embodiment

Also in a fourth embodiment, a plurality of end points are connected to one root complex 14 in the same manner as the second and third embodiments. In the embodiment described above, since the sequential header is the only first DW 0 of the normal header and does not include the requester ID for specifying the transmission device, if the TLPs are transmitted from the plurality of end points, it is necessary to deal with the TLPs in a manner as the second and third embodiments. In the fourth embodiment, the sequential header is modified to include the requester ID. For this reason, the history tables 42 and 44 are unnecessary. Since a block diagram of the information processing system of the fourth embodiment is the same as the block diagram of the second embodiment illustrated in FIG. 8 except for the above, the block diagram of the information processing system of the fourth embodiment will be omitted.

Figure 12A:
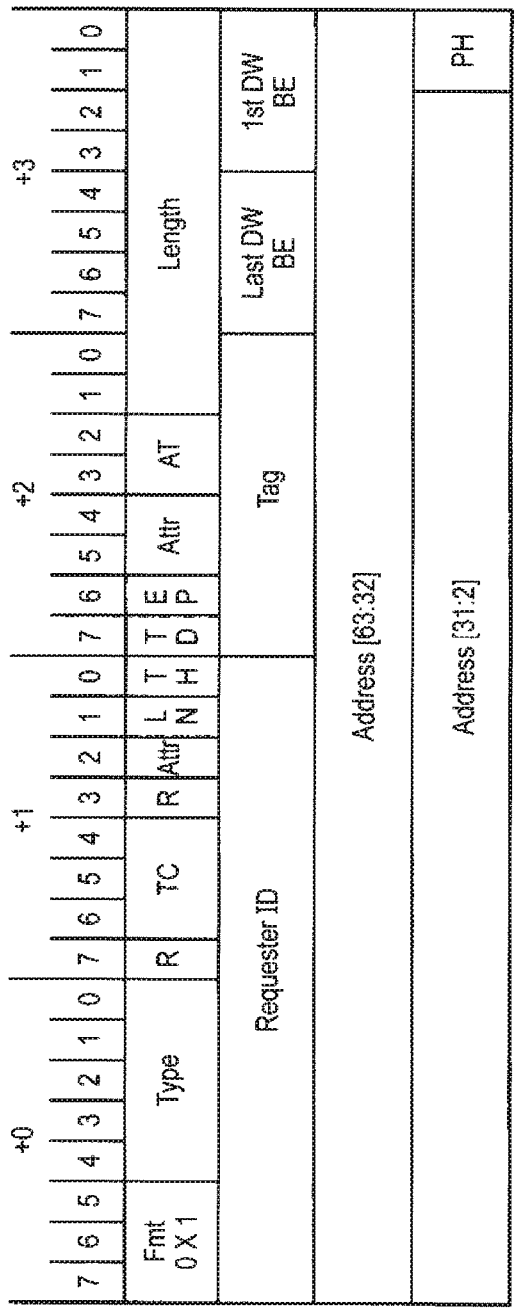
FIGS. 12A and 12B are diagrams illustrating examples of headers of a write TLP according to a fourth embodiment.
Figure 12B:
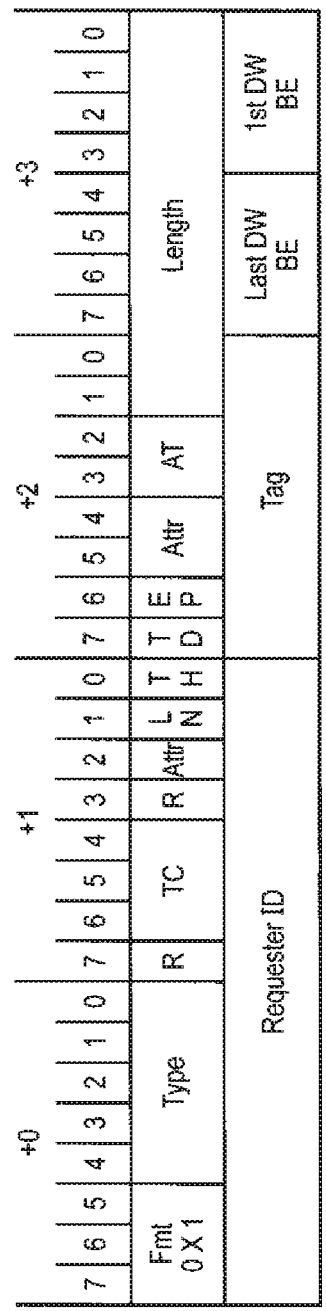

FIGS. 12A and 12B illustrate examples of headers of the write TLP according to the fourth embodiment. FIG. 12A illustrates an example of the normal header. FIG. 12B illustrates an example of the sequential header. The normal header illustrated in FIG. 12A is the same as the normal header illustrated in FIG. 3A. The sequential header illustrated in FIG. 12B is 2 DWs of a head of the normal header and DW 2 and DW 3 of the normal header are omitted. That is, the sequential header includes the requester ID.

In the fourth embodiment, each of the end point 34 in the SSD 30 and the end point 46 in the graphics board 48 continuously transmits a plurality of write TLPs to a root complex 14 via the switch 40 in the same manner as the second and third embodiments. The end points 34 and 46 use the normal header as a header of the first TLP and use the sequential headers as headers of the second and following TLPs. The fourth embodiment differs from the second and third embodiments in the contents of the sequential header.

When receiving a write TLP from the first end point 34, the switch 40 transmits the write TLP to the root complex 14 as it is. Even when receiving the write TLP from the second end point 46, the switch 40 transmits the write TLP to the root complex 14 as it is. That is, in the same manner as the second embodiment illustrated in FIG. 10, there is a possibility that the root complex 14 receives write TLPs transmitted from the first end point 34 and the second end point 46 in a state in which the write TLPs transmitted from the second end point 46 are mixed in the write TLPs transmitted from the first end point 34. However, since the headers of all of the write TLPs include the requester ID for identifying the transmission device and thus the root complex 14 can identify the transmission devices of each of the memory write requests, the root complex 14 can convert the sequential header to the normal header.

FIGS. 13A and 13B illustrate an example of transmitting write TLPs when data of 1 MB is transmitted from the SSD 30 to the DRAM 12. FIG. 13A illustrates a transmission example of a comparative example. FIG. 13B illustrates a transmission example of the fourth embodiment. In the comparative example, all of the write TLPs include the normal header of 16 bytes. In the fourth embodiment, only first write TLP includes the normal header and the second and following write TLPs include the sequential header of 2 DWs (=8 bytes). The data length is set to 128 bytes and the data is transmitted with 8192 write TLPs. In the comparative example, one write TLP is 152 bytes and the total amount of transmission of the 8192 write TLPs is 1,245,184 (=152×8192) bytes. In the fourth embodiment, the first write TLP is 152 bytes, each TLP of the second and following TLPs is 144 bytes, and the total amount of transmission of the 8192 write TLPs is 1,179,656 (=152+144×8191) bytes. In the fourth embodiment, transmission efficiency is improved by approximately 5% (=1,179,656/1,245,184) as compared with the comparative example.

According to the fourth embodiment, since the PCIe switch does not need to monitor continuity of a transmission/reception relationship between the write TLPs transmitted from the plurality of the transmission devices by using the history tables 42 and 44 as in the second embodiment, the configuration becomes simple. In addition, since the PCIe switch 40 does not need to convert the sequential header into the normal header and to transmit the write TLP including the normal header instead of the sequential header to the root complex 14, it is possible to improve the transmission efficiency as compared with the second embodiment. Further, since transmission from ports other than a specific port is not stopped as in the third embodiment, data from any of the end points 34 and 46 can be transmitted to the root complex 14 without delay.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
   a first transmission device configured to sequentially transmit, to a destination device, a first packet and a second packet each containing data to be stored in contiguous logical addresses of the destination device;
   a second transmission device configured to sequentially transmit, to the destination device, a third packet and a fourth packet each containing data to be stored in contiguous logical addresses of the destination device; and
   a switch which is connected to the first transmission device and the second transmission device and is configured to output packets received thereby to the destination device in the order the packets are received, wherein
   the first packet includes a first header,
   the second packet includes a second header smaller in size than the first header,
   the third packet includes a third header,
   the fourth packet includes a fourth header smaller in size than the third header, and
   the switch is configured to alter the second header such that the size of the second header becomes equal to the size of the first header if the third packet is received in between the first and second packets, and the switch is configured to output the second packet with the altered second header to the destination device.

2. The information processing system according to claim 1, wherein
the first header includes a first part and a second part,
the second header includes a third part corresponding to the first part and does not include a part corresponding to the second part.

3. The information processing system according to claim 2, wherein
the first part and the third part include first information indicating whether the first header or the second header is a normal header or a sequential header, and second information indicating a data length of the first packet or the second packet, and
the second part includes a destination address.

4. The information processing system according to claim 3, wherein the first part and the third part further include identification information of the first transmission device.

5. The information processing system according to claim 3, wherein the second part further includes identification information of the first transmission device.

6. The information processing system according to claim 1, wherein
the first packet further includes first data and an error check code calculated from the first header and the first data, and
the second packet further includes second data and an error check code calculated from the second header and the second data.

7. The information processing system according to claim 1, wherein
the first packet and the second packet are transmitted to the destination device according to PCI express standards.

8. The information processing system according to claim 2, wherein the altered second header includes the third part and a part corresponding to the second part.

9. An information processing method comprising:
sequentially transmitting, from a first transmission device to a destination device via a switch connected to the first transmission device, a first packet and a second packet each containing data to be stored in contiguous logical addresses of the destination device;
sequentially transmitting, from a second transmission device to the destination device via the switch connected to the second transmission device, a third packet and a fourth packet each containing data to be stored in contiguous logical addresses of the destination device;
receiving and buffering the first, second, third and fourth packets by the switch; and
outputting, from the switch, the first, second, third and fourth packets received by the switch to the destination device in the order the packets are received by the switch, wherein the third packet is received by the switch after the first packet is received and before the second packet is received, wherein
the first packet received by the switch from the first transmission device includes a first header,
the second packet received by the switch from the first transmission device includes a second header smaller in size than the first header,
the third packet received by the switch from the second transmission device includes a third header, and
the fourth packet received by the switch from the second transmission device includes a fourth header smaller in size than the third header, wherein the method further comprises:
altering, by the switch, the second header such that the size of the second header becomes equal to the size of the first header, and
wherein the outputting comprises outputting, from the switch, the second packet with the altered second header to the destination device.

10. The information processing method according to claim 9, wherein
the first header includes a first part and a second part,
the second header includes a third part corresponding to the first part and does not include a part corresponding to the second part.

11. The information processing method according to claim 10, wherein
the first part and the third part include first information indicating whether the first header or the second header is a normal header or a sequential header, and second information indicating a data length of the first packet or the second packet, and
the second part includes a destination address.

12. The information processing method according to claim 11, wherein the first part and the third part further include identification information of the first transmission device.

13. The information processing method according to claim 11, wherein the second part further includes identification information of the first transmission device.

14. The information processing method according to claim 9, wherein
the first packet further includes first data and an error check code calculated from the first header and the first data, and
the second packet further includes second data and an error check code calculated from the second header and the second data.

15. The information processing method according to claim 9, wherein
the first packet and the second packet are transmitted to the destination device according to PCI express standards.

* * * * *